UNITED STATES PATENT OFFICE.

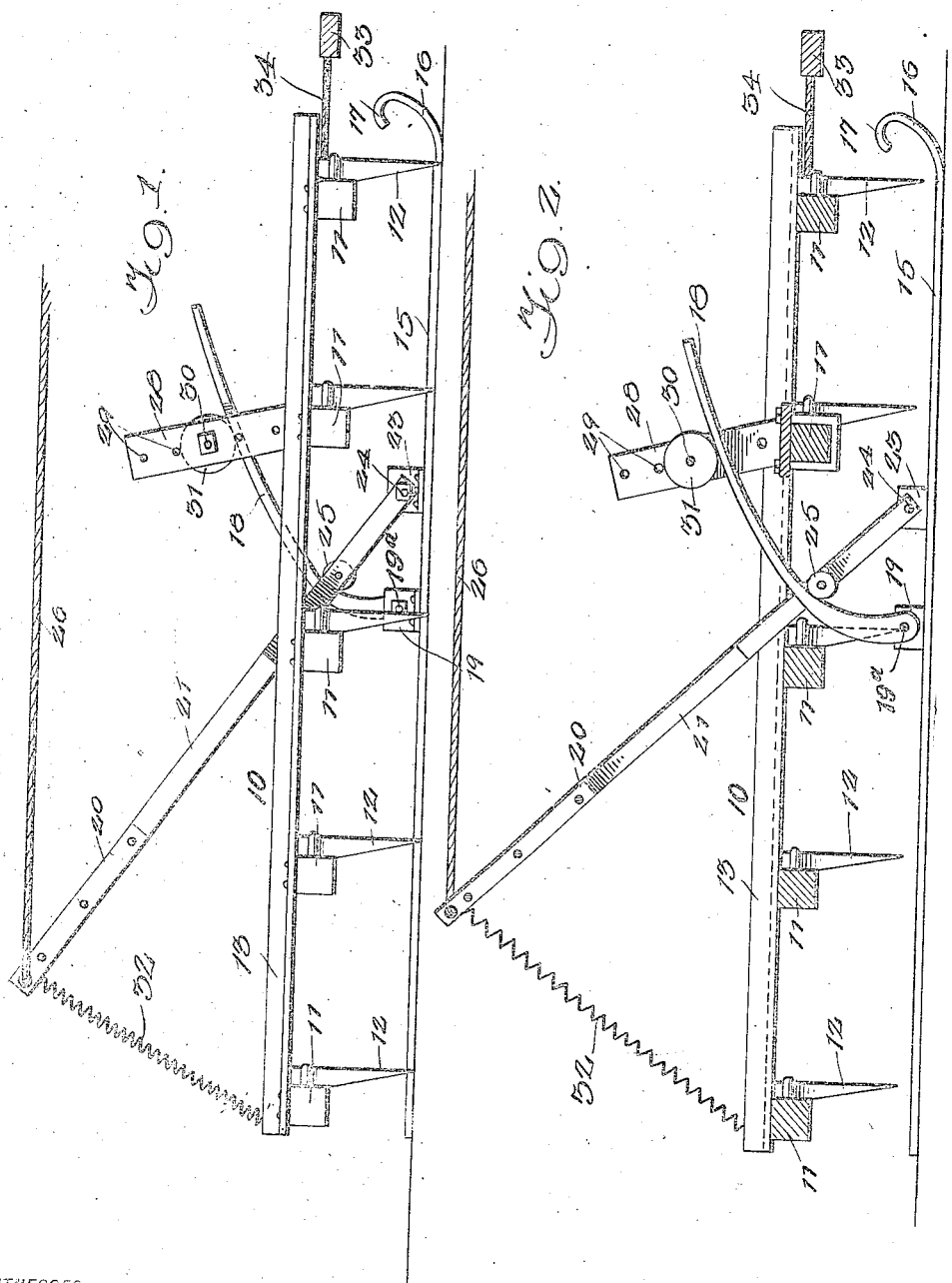

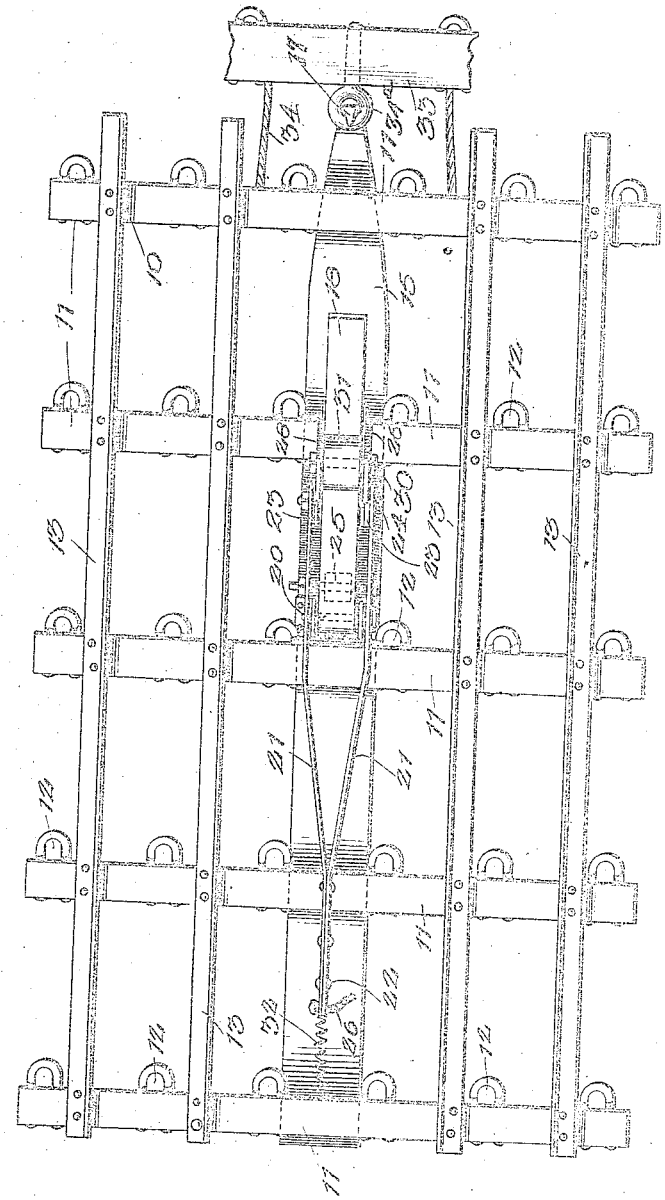

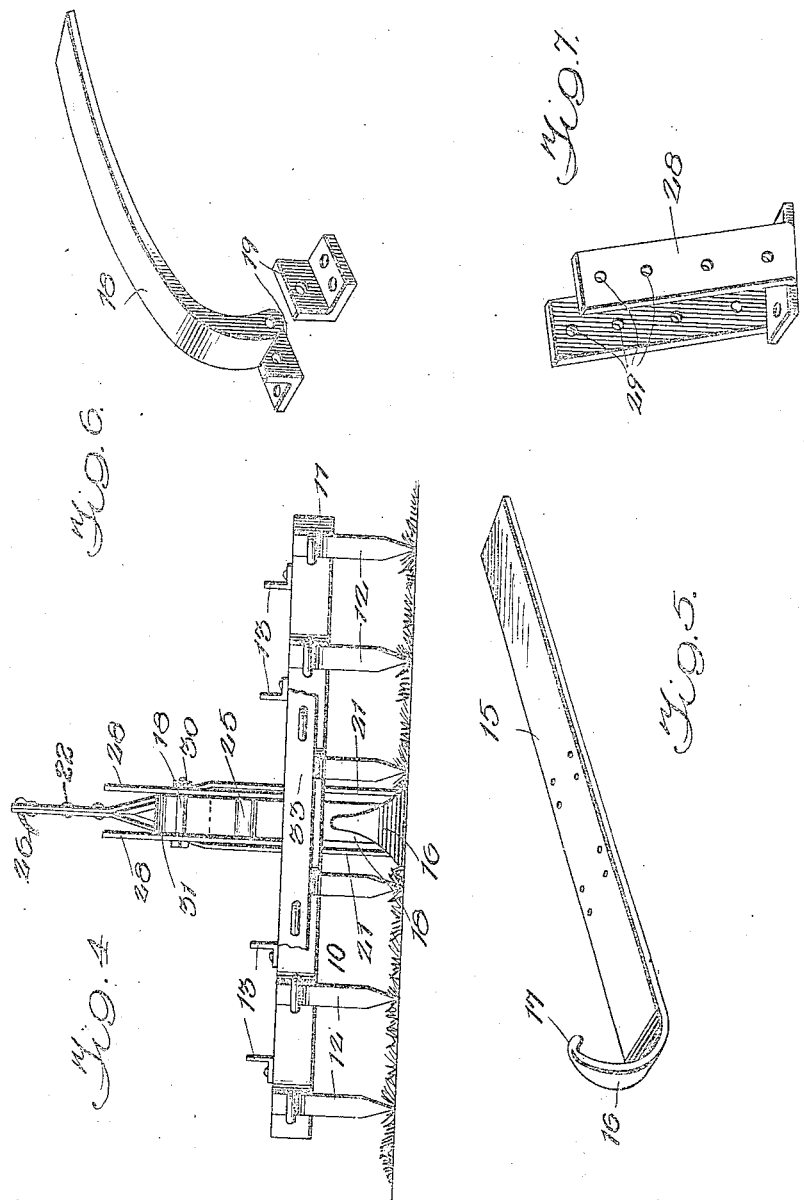

FRANK GRANVILLE BIGGERSTAFF, OF KANSAS CITY, MISSOURI.

HARROW.

1,422,173.

Specification of Letters Patent.  Patented July 11, 1922.

Application filed November 27, 1920. Serial No. 426,787.

*To all whom it may concern:*

Be it known that I, FRANK GRANVILLE BIGGERSTAFF, a citizen of the United States, and a resident of Kansas City, in the county of Jackson and State of Missouri, have invented certain new and useful Improvements in Harrows, of which the following is a specification.

The present invention relates to harrows. The object of the invention is to provide a harrow which may be rendered operable or inoperable at will and while in motion, which may be raised above the ground whereby to be cleaned of accumulated debris and which is of simple and durable construction, reliable in operation and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a side elevational view, showing the harrow in operative position;

Figure 2 is a side elevational view, showing the harrow raised from the ground and in inoperative position;

Figure 3 is a plan view;

Figure 4 is a front elevational view;

Figure 5 is a detail perspective view of the runner;

Figure 6 is a partly perspective view of the curved cam lever and means for pivotally connecting it to the runner; and Figure 7 is a detail perspective view of the standard.

Referring to the drawings wherein for the sake of illustration is shown the preferred embodiment of the invention, it will be seen that the invention contemplates a harrow designated generally at 10 and embodying cross bars 11 to which the harrow teeth 12 are secured and longitudinal stringers 13 secured to the cross bars. The harrow may be drawn by a tractor or in any other suitable manner.

A runner 15 of flat elongated form and having an upturned end 16 terminating in a hook 17 is arranged beneath the harrow and is adapted for sliding contact with the ground. The runner is preferably arranged centrally of the harrow and preferably extends for slightly more than the entire length thereof, as clearly shown in Figure 3.

A curved cam lever 18 is pivoted to the runner by means of spaced angle brackets 19 and a pivot bolt 19$^a$ extending between the angle brackets and through a suitable pivot opening provided in the curved cam lever. An operating lever 20 preferably in the form of a hand lever is provided and includes a pair of bars 21 secured together at their upper end, as shown at 22, and pivoted at their lower end to the runner at a point spaced from the pivotal connection of the cam lever thereto by means of angle brackets 23 and a pivot bolt 24. A roller 25 is rotatably journaled in the bars 21 of the operating lever, and is arranged to engage the under flat face of the cam lever 18. The cam lever 18 and the operating lever 20 constitute cooperable levers for controlling the runner as will be hereinafter more fully described. If desired, a controlling element 26 such as a rope or the like may be led from the upper end of the operating lever to the driver of the tractor or other means utilized for pulling the harrow.

An abutment for the curved cam lever is provided and consists of rearwardly inclined spaced standards 28 secured at their base to one of the cross bars 11 of the harrow and having provided therein vertically spaced and horizontally alined pivot openings 29. Each pair of alined pivot holes is adapted to receive the axle 30 of a second roller 31, whereby the roller may be adjusted vertically. The roller 31 is adapted to engage the upper flat face of the curved cam lever 18, that is, this roller 31 engages the side of the cam lever opposite from the side of the cam lever engaged by the roller 25.

Spring means, consisting of a retractile coil spring 32, is provided for biasing the hand operated lever whereby it is normally in such position that the runner 15 controlled thereby in the position shown in Figure 1 and the harrow is in operative position with respect to the ground. When the hand operated lever is pulled by means of the flexible element 26, the spring is elongated and put under greater tension and tends to return the hand operated lever to the position shown in Figure 1 and to permit the harrow to return to normal ground engaging position.

A draw bar 33 is connected to the harrow by flexible elements or the like 34 and to the runner by means of an eye 34ª receiving the hook 17 at the forward end of the runner.

In operation when the harrow is being drawn along the ground the runner 15 also slides over the ground and at this time the runner carries only its own weight and the weight of the cooperating levers. When it is desired to render the harrow inactive or to clean the harrow of accumulated débris, the operating lever 20 is swung in a clockwise direction as by exerting a pull upon the flexible element 26. This causes the roller 25 to proceed along and exert a pressure against the curved cam lever 18 which having a sliding engagement with the roller 31 of the abutment results in the exercise of a downward thrust upon the runner 15 to throw the same into engagement with the ground. This action effects the elevation of the harrow to above the ground so that the weight of the harrow is taken by the runner and the harrow is rendered inoperative and the same is cleaned of débris.

I claim:

1. In combination, a harrow including cross bars, a runner arranged beneath the harrow, a curved cam lever, means for pivotally connecting said curved cam lever to said runner, an operating lever including spaced bars and having a roller journaled between said bars and engaged with one side of said cam lever, means for pivotally connecting said operating lever to said runner, spaced standards fixed to one of said cross bars and having a roller mounted therebetween and engaged with the cam lever on the opposite side from said first-mentioned roller, and spring means for biasing said operating lever.

2. In combination, a harrow including cross bars, a runner arranged beneath the harrow, a curved cam lever, means for pivotally connecting said curved cam lever to said runner, an operating lever including spaced bars and having a roller journaled between said bars and engaged with one side of said cam lever, means for pivotally connecting said operating lever to said runner, and spaced standards fixed to one of said cross bars and having a roller mounted thereon and engaged with the cam lever on the opposite side from said first-mentioned roller.

3. In combination, a harrow, a runner arranged beneath the harrow, a curved cam lever pivoted to the runner, an operating lever pivoted to said runner and including spaced bars and having a roller journaled between said bars and engaged with one side of said cam lever, and an abutment arranged upon said harrow and including a roller engaged with said cam lever on the opposite side from said first-mentioned roller.

4. In a device of the character described for use with harrows, a runner, a curved cam lever pivoted to said runner, an operating lever pivoted to said runner and having a roller engaged with said cam lever on one side thereof and a standard arranged upon the harrow and having a roller engaged with said cam lever on the opposite side from said first-mentioned roller.

5. In a device of the character described for use with harrows, a runner, a cam lever connected to said runner, an operating lever connected to said runner and having a roller engaged with the cam lever and an abutment for said cam lever arranged upon the harrow, and spring means for biasing said operating lever.

6. In a device of the character described for use with harrows, a runner, a cam lever connected to said runner, an operating lever connected to said runner and having a roller engaged with said cam lever and an abutment for said cam lever arranged upon the harrow.

7. In a device of the character described for use with harrows, a runner, cooperable levers pivoted to said runner, and an abutment arranged upon the harrow and engaged with one of said levers.

FRANK GRANVILLE BIGGERSTAFF.